US012742995B2

(12) United States Patent
Josberger et al.

(10) Patent No.: US 12,742,995 B2
(45) Date of Patent: Sep. 22, 2026

(54) METASURFACE DEVICES WITH MULTILAYER PASSIVATION COATINGS

(71) Applicant: Lumotive, Inc., Redmond, WA (US)

(72) Inventors: Erik Edward Josberger, Renton, WA (US); Lie "Larry" Zhao, Washougal, WA (US); Linda Gail Conway, Duvall, WA (US); Gleb M. Akselrod, Kenmore, WA (US)

(73) Assignee: Lumotive, Inc., Redmond, WA (US)

( * ) Notice: Subject to any disclaimer, the term of this patent is extended or adjusted under 35 U.S.C. 154(b) by 274 days.

(21) Appl. No.: 18/421,651

(22) Filed: Jan. 24, 2024

(65) Prior Publication Data

US 2025/0237927 A1 Jul. 24, 2025

(51) Int. Cl.
*G02F 1/29* (2006.01)

(52) U.S. Cl.
CPC .......... *G02F 1/292* (2013.01); *G02F 2202/30* (2013.01); *G02F 2203/15* (2013.01)

(58) Field of Classification Search
CPC .......................... G02F 2202/30; G02F 2203/15
See application file for complete search history.

(56) References Cited

U.S. PATENT DOCUMENTS 10,451,800 B2 10/2019 Akselrod
10,665,953 B1 5/2020 Akselrod
10,915,002 B2 2/2021 Akselrod
10,968,522 B2 4/2021 Akselrod et al.
11,037,973 B2 6/2021 Akselrod
11,092,675 B2 8/2021 Akselrod
11,429,008 B1 8/2022 Akselrod
11,487,183 B1 * 11/2022 Akselrod ............... B05D 5/063
11,493,823 B1 * 11/2022 Akselrod ............. H01Q 15/148
11,846,865 B1 * 12/2023 Akselrod .................. G02F 1/29
11,914,266 B1 2/2024 Akselrod
2005/0242444 A1 11/2005 Huang et al.
2012/0194399 A1 8/2012 Bily
2014/0266946 A1 9/2014 Bily
2015/0162658 A1 6/2015 Bowers
2015/0318618 A1 11/2015 Chen
2015/0318620 A1 11/2015 Black
2015/0372389 A1 12/2015 Chen
2015/0380828 A1 12/2015 Black
2018/0239021 A1 8/2018 Akselrod
2018/0239213 A1 8/2018 Akselrod
(Continued)

FOREIGN PATENT DOCUMENTS

WO 2018156793 A1 8/2018

OTHER PUBLICATIONS

Written Opinion of the International Searching Authority for PCT/US2025/012992, mailed Jun. 3, 2025 (ISA/US).
(Continued)

*Primary Examiner* — Jessica M Merlin
(74) *Attorney, Agent, or Firm* — PCFB, LLC; Justin K. Flanagan

(57) ABSTRACT

A tunable optical device includes a dielectric substrate with an array of metallic extension elements extending therefrom. The metallic extension elements are spaced closely together with subwavelength gaps between them. A multilayer passivation coating is applied to at least the opposing sidewalls and the top wall of each metallic extension element.

27 Claims, 10 Drawing Sheets

(56) References Cited

U.S. PATENT DOCUMENTS

2018/0241131 A1* 8/2018 Akselrod .............. H10F 39/806
2018/0248267 A1 8/2018 Akselrod
2018/0351093 A1 12/2018 Wu
2019/0285798 A1* 9/2019 Akselrod ............. G02B 6/1226
2019/0301025 A1* 10/2019 Akselrod ................ G02F 1/216
2021/0141060 A1* 5/2021 Akselrod ................ G01S 7/486
2023/0333431 A1* 10/2023 Bowen ................ G02F 1/13306
2024/0353624 A1 10/2024 Akselrod et al.

OTHER PUBLICATIONS

International Search Report for PCT/US2025/012992, mailed Jun. 3, 2025 (ISA/US).
U.S. Appl. No. 18/329,526, Non-Final Office Action mailed Sep. 26, 2023, 10 pp.

* cited by examiner

METASURFACE DEVICES WITH MULTILAYER PASSIVATION COATINGS

TECHNICAL FIELD

This disclosure relates to optical metasurfaces, reflectors, deflectors, and antenna elements, including tunable optical metasurfaces. More particularly, this disclosure relates to the passivation of metallic elements of a metasurface.

DETAILED DESCRIPTION

Figure 1A:
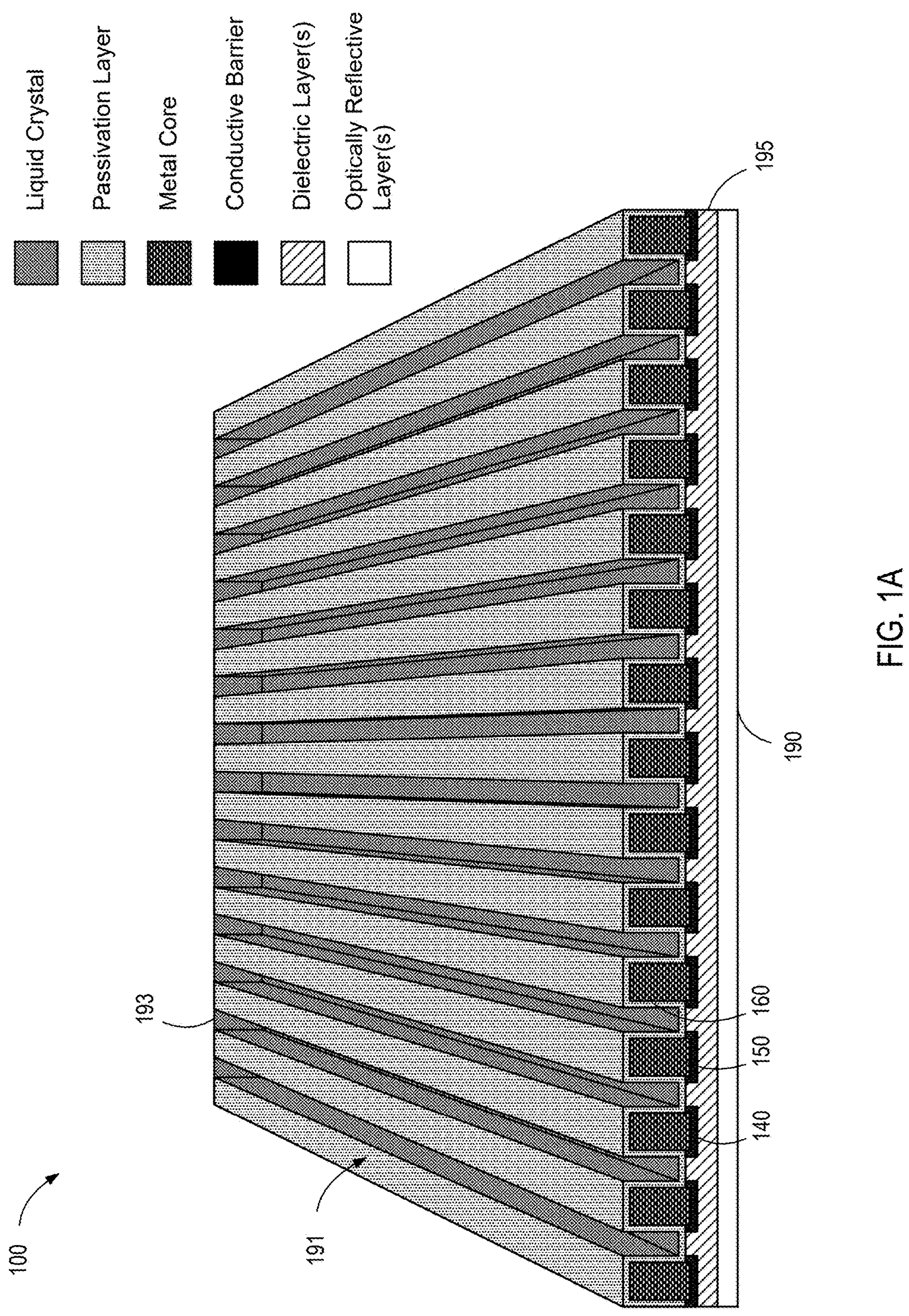
FIG. 1A illustrates an example diagram of a tunable metasurface, according to one embodiment.

Tunable optical metasurfaces may be used for beamforming, including three-dimensional beam shaping, two-dimensional beam steering, and/or one-dimensional beam steering. The presently described systems and methods can be applied to tunable metasurfaces utilizing various architectures and designs to deflect optical radiation within an operational bandwidth. In various embodiments, a controller or metasurface driver selectively applies a pattern of voltages to an array of optical structures. Voltage differentials across adjacent optical structures modify the refractive indices of dielectric material therebetween. A combination of phase delays created by the pattern of applied voltages creates constructive interference in the desired beam steering direction.

The presently described systems and methods include the use of multilayer passivation coatings to improve the functionality and/or longevity of the metasurface. According to various embodiments, a metasurface includes a dielectric substrate with an array of metallic extension elements extending therefrom. For example, the metallic extension elements may extend vertically from the dielectric substrate and be spaced from one another by less than a wavelength of an operational bandwidth to form subwavelength gaps between adjacent metallic extension elements. Each metallic extension element may include a metal core having a base wall, opposing sidewalls, and a top wall. A conductive barrier material may be positioned between the base wall of each metal core and the dielectric substrate. A tunable dielectric material that has a tunable refractive index, such as liquid crystal, is positioned within the gaps between adjacent metallic extension elements. A multilayer passivation coating is applied to at least the opposing sidewalls and the top wall of the metal core of each respective metallic extension element. The multilayer passivation coating may include two or more layers. For example, a first passivation coating may exhibit strong adhesion properties to the metal core and prevent corrosion of the metal core. A second passivation coating may exhibit surface characteristics that facilitate alignment of the tunable dielectric to increase the switching speed of the tunable dielectric (e.g., liquid crystal).

In some embodiments, a third passivation coating is positioned between the first and second passivation coatings. The terms first, second, and third are used to distinguish between the various layers or coatings of the multilayer passivation coating but are not intended to define a specific order or name a specific layer based on particular properties thereof.

In some examples, at least the sidewalls and top wall of the metallic extension elements of a tunable optical device have a multilayer passivation coating in which the outermost layer is selected to be resistant to damage (e.g., physical damage and/or chemical damage) by a manufacturing process associated with depositing the tunable dielectric material. As in other embodiments, the first passivation coating applied to the metallic extension elements may operate to at least exhibit strong adhesion properties to the outermost most metal layer of each metallic extension element and prevent corrosion thereof.

For example, the tunable dielectric material deposited after the outermost passivation coating is applied to the metallic extension elements may be one or more of liquid crystal, an electro-optic polymer, a chalcogenide glass, or a suitable tunable semiconductor material. The manufacturing processes associated with the deposition of the tunable dielectric material may include various etching processes, cleaning processes, pre-deposition treatment processes, deposition processes, and/or various post-deposition processes. The second passivation coating may be selected to protect the first passivation coating from being damaged by an oxygen plasma cleaning process, a pre-cleaning process, a pulse laser deposition process, an annealing process, a physical vapor deposition (PVD) process, or the like.

As in other embodiments, each of the first and second passivation coatings may, for example, comprise one or more combinations of or layers of: $Al_2O_3$, $TiO_2$, $HfO_2$, AlN, $ZrO_2$, $SiO_2$, and SiN. Where the first passivation coating layer is considered the layer adhered to the metallic extension elements and the second passivation coating layer is considered the outermost passivation coating layer in contact with the tunable dielectric material, any number of additional coating layers (e.g., a third passivation coating layer) may be positioned between the first passivation coating layer and the second passivation coating layer. For example, a third passivation coating may facilitate adhesion of the second passivation coating to the first passivation coating and/or the function as a diffusion barrier to prevent diffusion of metal from the metal core into the tunable dielectric.

Various examples of tunable optical metasurfaces are described herein and depicted in the figures. For example, a tunable optical metasurface includes an array of metallic extension elements (e.g., antenna elements, resonator elements, elongated resonator rails, metallic pillar pairs, etc.). For instance, the array of metallic extension elements may comprise a one-dimensional array of elongated metallic resonator rails arranged parallel to one another with respect to an optical reflector, such as an optically reflective layer or patches of metal or a Bragg reflector. Liquid crystal, or another refractive index tunable dielectric material, is positioned in the gaps or channels between adjacent resonator rails. Liquid crystal is used in many of the examples provided in this disclosure. However, it is appreciated that alternative dielectric materials with tunable refractive indices and/or combinations of different dielectric materials with tunable refractive indices may be utilized instead of liquid crystal in many instances. Examples of suitable tunable dielectric materials that have tunable refractive indices include liquid crystals, electro-optic polymer, chalcogenide glasses, and/or various semiconductor materials.

In some examples, a two-dimensionally steerable tunable optical device may include a two-dimensional array of metallic extension elements, such as circular pillars, rectangular pillars, square pillars, etc., that extend vertically within the resonator layer. Liquid crystal is deposited between adjacent metallic extension elements. Accordingly, the tunable optical metasurface can be described as including a tunable resonator layer with a plurality of tunable optical resonators (in a one-dimensional or two-dimensional array), where each tunable optical resonator comprises two adjacent metallic extension elements with liquid crystal deposited therebetween. Each tunable optical resonator can be tuned to reflect optical radiation with an operational bandwidth with a different phase and/or amplitude by controlling the voltage between the adjacent metallic extension elements.

In various embodiments, biasing the liquid crystal in a metasurface with a pattern of voltage biases changes the reflection phase of the optical radiation. For example, each different voltage pattern applied across the metasurface corresponds to a different reflection phase pattern. Each different reflection phase pattern of a one-dimensional array of optical structures (e.g., elongated metal resonator rails) corresponds to a different steering angle in a single dimension. A digital or analog controller (controlling current and/or voltage), such as a metasurface driver, may apply a differential voltage bias pattern to achieve a target beam shaping, such as a target beam steering angle. The term "beam shaping" is used herein in a broad sense to encompass one-dimensional beam steering, two-dimensional beam steering, wavelength filtering, beam divergence, beam convergence, beam focusing, and/or controlled deflection, refraction, and/or reflection of incident optical radiation.

As described herein, the metal extension elements, whether in a two-dimensional array or a one-dimensional array, may be coated with a multilayer passivation coating to prevent corrosion of the metal extension elements, prevent diffusion of the metal into the liquid crystal, prevent the liquid crystal from damaging the metal, increase optical reflectively, and/or improve the switching response of the liquid crystal to voltage changes.

According to various embodiments, each metallic extension element includes a metal core (e.g., copper) that has a base wall, substantially parallel sidewalls, and a top wall. A conductive barrier material may separate the base wall of each metallic extension element from the underlying dielectric substrate (e.g., an etch-stop layer). As previously described, the metallic extension elements may be formed as elongated rails, circular pillars, rectangular pillars, oval pillars, hexagonal pillars, irregular pillars and shapes, and/or polygonal shapes that extend from a dielectric layer. Regardless of the specific shape of the metallic extension elements, the faces that are exposed to the liquid crystal may be coated with one or more coatings for passivation. The multiple coatings are referred to herein as multilayer passivation coatings; however, it is appreciated that one or more of the coatings may be a corrosion-resistant coating, a diffusion barrier coating, a metal protectant coating, a liquid crystal interface coating, a reflective coating, and/or the other coatings.

The metal core of each metallic extension element is illustrated and described in many instances as being copper or as including copper (e.g., a copper alloy). Devices with copper metal cores may, for example, be fabricated using damascene processes for semiconductor devices. However, it is appreciated that other metals may also be utilized, including but not limited to tungsten, aluminum, copper alloys, and/or combinations thereof.

One or more walls of the metal core of each elongated metal rail may be coated with the coatings described herein. In some examples, additional coatings may also be utilized for adhesion, additional reflectivity, increased corrosion resistance, decreased dopant, alloy leaching, etc. For example, an optically reflective metal coating may comprise a highly reflective silver layer applied to a copper metal core. In some instances, the optically reflective metal coating may include a thin adhesion layer of cobalt applied to the copper metal core, followed by a highly reflective outer layer of silver.

The passivation coating may be deposited on the tunable optical device as a single or uniform layer that covers the sidewalls and top wall of each elongated metal rail and the base or lower surface of each channel. In various embodiments, each coating layer of the multilayer passivation coating is deposited using atomic layer deposition (ALD) or another thin-layer semiconductor deposition technique.

One or more layers of the multilayer passivation coating may include one or more of silicon nitride, silicon carbide nitride, silicon carbide, aluminum oxide ($AlO_x$), hafnium oxide ($HfO_2$, silicon oxide ($SiO_2$), aluminum nitride (AlN), and boron nitride (BN). One or more layers of the multilayer passivation coating may include one or more of silver (Ag), gold (Au), cobalt (Co), or ruthenium (Ru).

The various tunable metasurface devices described herein can be manufactured using various semiconductor manufacturing processes including, but not limited to, damascene processes, deposition processes, etching processes, lithography processes, patterning processes, chemical mechanical planarization processes, and the like. One example of a manufacturing process is etching a dielectric layer to form an array of parallel elongated trenches or cavities in the dielectric layer.

Additional descriptions, variations, functionalities, and usages for optical metasurfaces are described in U.S. Pat. No. 10,451,800 granted on Oct. 22, 2019, entitled "Plasmonic Surface-Scattering Elements and Metasurfaces for Optical Beam Steering;" U.S. Pat. No. 10,665,953 granted on May 26, 2020, entitled "Tunable Liquid Crystal Metasurfaces;" and U.S. Pat. No. 11,092,675 granted on Aug. 17, 2021, entitled "Lidar Systems based on Tunable Optical Metasurfaces," each of which is hereby incorporated by reference in its entirety. Many of the metasurfaces described in the above-identified U.S. patents include one-dimensional arrays of parallel rails, two-dimensional arrays of elongated rails, and/or two-dimensional arrays of pillars positioned above a planar reflective surface, reflective layers, or optically transmissive surfaces.

This disclosure includes various embodiments and variations of tunable optical metasurface devices and methods for manufacturing the same. It is appreciated that the metasurface technologies described herein may incorporate or otherwise leverage prior advancements in surface scattering antennas, such as those described in U.S. Patent Publication No. 2012/0194399, published on Aug. 2, 2012, entitled "Surface Scattering Antennas;" U.S. Patent Publication No. 2019/0285798 published on Sep. 19, 2019, entitled "Plasmonic Surface-Scattering Elements and Metasurfaces for Optical Beam Steering;" and U.S. Patent Publication No. 2018/0241131 published on Aug. 23, 2018, entitled "Optical Surface-Scattering Elements and Metasurfaces;" each of which is hereby incorporated by reference in its entirety. Additional elements, applications, and features of surface scattering antennas are described in U.S. Patent Publication No. 2014/0266946, published Sep. 18, 2014, entitled "Surface Scattering Antenna Improvements;" U.S. Patent Publication No. 2015/0318618, published Nov. 5, 2015, entitled "Surface Scattering Antennas with Lumped Elements;" U.S. Patent Publication No. 2015/0318620 published Nov. 5, 2015, entitled "Curved Surface Scattering Antennas;" U.S. Patent Publication No. 2015/0380828 published on Dec. 31, 2015, entitled "Slotted Surface Scattering Antennas;" U.S. Patent Publication No. 2015/0162658 published Jun. 11, 2015, entitled "Surface Scattering Reflector Antenna;" U.S. Patent Publication No. 2015/0372389 published Dec. 24, 2015, entitled "Modulation Patterns for Surface Scattering Antennas;" PCT Application No. PCT/US18/19269 filed on Feb. 22, 2018, entitled "Control Circuitry and Fabrication Techniques for Optical Metasurfaces," U.S. Patent Publication No. 2019/0301025 published on Oct. 3, 2019, entitled "Fabrication of Metallic Optical Metasurfaces;" U.S. Publication No. 2018/0248267 published on Aug. 30, 2018, entitled "Optical Beam-Steering Devices and Methods Utilizing Surface Scattering Metasurfaces;" and U.S. patent application Ser. No. 17/685,621 filed on Mar. 3, 2022, entitled "Liquid Crystal Metasurfaces with Cross-Backplane Optical Reflectors," each of which is hereby incorporated by reference in its entirety.

In various embodiments, the elongated metal rails, pillars, or other metallic extension structures (e.g., metallic optical elements) have subwavelength dimensions suitable for operation within a specific bandwidth of optical frequencies (e.g., a bandwidth of infrared optical frequencies). The width of each metallic optical element may be, for example, less than the smallest wavelength of the operational bandwidth.

Any of the variously described embodiments herein may be manufactured with dimensions suitable for optical bandwidths for optical sensing systems such as LiDAR, optical communications systems, optical computing systems, and displays. For example, the systems and methods described herein can be configured with metasurfaces that operate in the sub-infrared, mid-infrared, high-infrared, and/or visible-frequency ranges (generally referred to herein as "optical"). Given the feature sizes needed for sub-wavelength optical antennas and antenna spacings, the described metasurfaces may be manufactured using micro-lithographic and/or nano-lithographic processes, such as fabrication methods commonly used to manufacture complementary metal-oxide-semiconductor (CMOS) integrated circuits.

The components of some of the disclosed embodiments are described and illustrated in the figures herein to provide specific examples. Many portions thereof could be arranged and designed in a wide variety of different configurations. Furthermore, the features, structures, and operations associated with one embodiment may be applied to or combined with the features, structures, or operations described in conjunction with another embodiment. In many instances, well-known structures, materials, or operations are not shown or described in detail to avoid obscuring aspects of this disclosure. The right to add any described embodiment or feature to any one of the figures and/or as a new figure is explicitly reserved.

The embodiments of the systems and methods provided within this disclosure are not intended to limit the scope of the disclosure but are merely representative of possible embodiments. In addition, the steps of a method do not necessarily need to be executed in any specific order, or even sequentially, nor do the steps need to be executed only once, except as explicitly stated or as contextually understood by one of skill in the art.

FIG. 1A illustrates an example of a diagram of a tunable metasurface 100, according to one embodiment. The tunable metasurface 100 can, for example, be used as part of a solid-state optical transmitter system, receiver system, or transceiver system. As illustrated, the tunable metasurface 100 includes an optical reflector layer 190 and a dielectric layer 195. A plurality of elongated rails 191 are arranged at sub-wavelength intervals on the optical reflector layer 190. The optical reflector layer 190 may be, for example, a layer of copper. The elongated rails 191 may be electrically separated from the optical reflector layer 190 by the dielectric layer 195. The elongated rails 191 may be referred to herein as "resonator rails" because the gaps between adjacent elongated rails 191 are resonant within the optical operational bandwidth of the metasurface. An adjustable optical resonator is formed, for example, by two adjacent elongated rails and the liquid crystal therebetween.

The elongated rails 191 may be made of metal or have a conductive metal core 150. A passivation layer or passivation coating 160 may be applied to the conductive metal core 150 to passivate the conductive metal core 150. A conductive barrier material 140 may separate a base wall of the metal core of each of the elongated rails 191 from the underlying substrate layers (e.g., the dielectric layer 195).

Liquid crystal or another refractive index tunable dielectric material 193 is positioned between the elongated rails 191. A controller or metasurface driver (not illustrated) may apply voltage differential bias patterns to the elongated rails 191 to modify a reflection phase of the resonators. The combination of phase delays imparted from all the elongated rails 191 can be used to generate constructive interference in a target beam steering direction. In some embodiments, electrical leads or control lines from the controller or metasurface driver may pass through vias or gaps in the optical reflector layer 190, through the dielectric layer 195, and make electrical connections with each respective elongated rail 191 or groups of elongated rails 191 via the conductive barrier material 140.

Figure 1B:
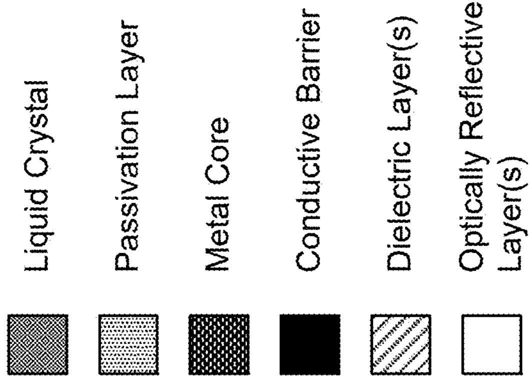
FIG. 1B illustrates an example diagram of liquid crystal positioned between two parallel elongated metal rails of a tunable metasurface, according to one embodiment.
Figure 1B:
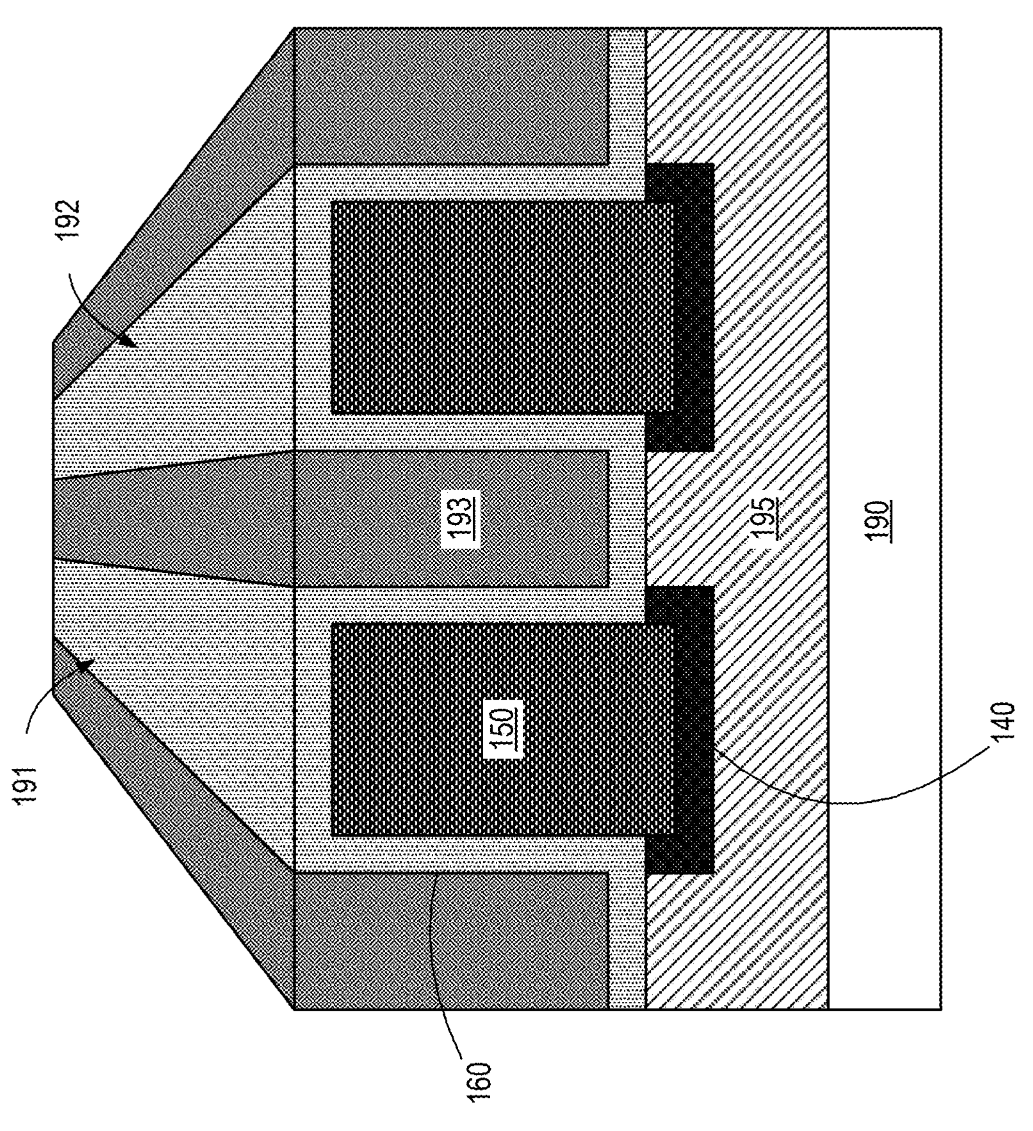

FIG. 1B illustrates an example diagram of the tunable dielectric material 193 (e.g., liquid crystal) positioned between two parallel elongated metal rails 191 and 192, according to one embodiment. As illustrated, the elongated metal rails 191 and 192 extend from the optical reflector layer 190 and are electrically isolated from the optical reflector layer 190 via the dielectric layer 195. The conductive metal core 150 of each metal rail 191 and 192 has a passivation coating 160 applied. The relative dimensions of widths, heights, lengths, and spacing of the elongated metal rails 191 and 192 and the relative thicknesses of the dielectric layer 195 and the optical reflector layer 190 are not necessarily to scale. Given the nanometer-scale of many of the features of the presently described systems and methods, many of the figures, including FIGS. 1A and 1B, include features that are not drawn to scale and are not intended to convey information about the actual or relative dimensions of the various elements.

Figure 2A:
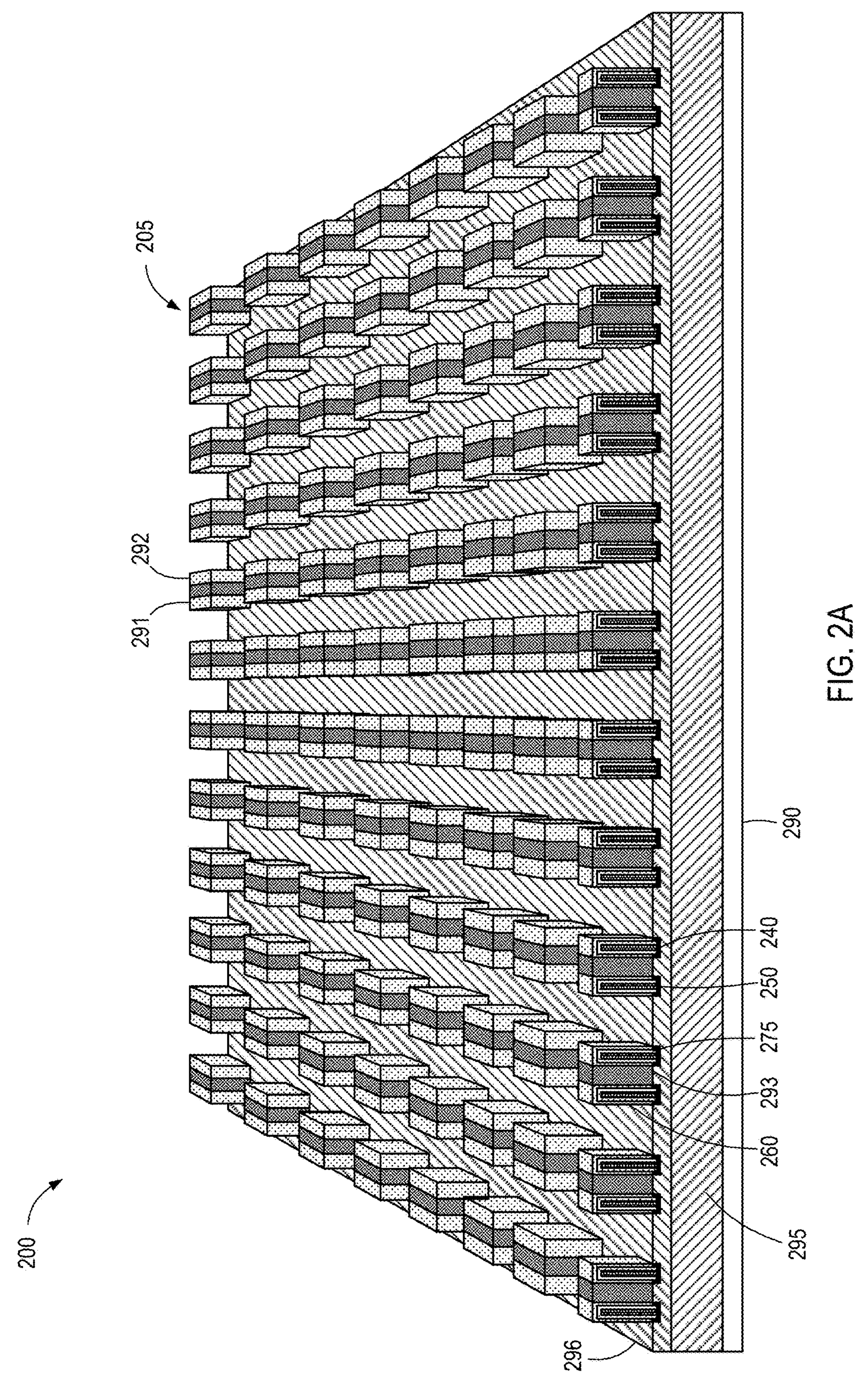
FIG. 2A illustrates a simplified embodiment of an optical surface scattering device with pairs of metal pillars with multilayer passivation coatings and adjustable refractive index material therebetween, according to one embodiment.

FIG. 2A illustrates a simplified embodiment of an optical metasurface 200 with a two-dimensional array of multicoated rectangular metal pillar pairs 205, according to one embodiment. Each multicoated rectangular metal pillar pair 205 includes two multicoated rectangular metal pillars 291 and 292 with adjustable refractive index material 293 deposited between them. In the illustrated example, the optical metasurface 200 includes one hundred and ninety-two multicoated rectangular metal pillars arranged in ninety-six pillar pairs. Each pair of multicoated rectangular metal pillars, together with the tunable dielectric therebetween, form a tunable optical resonator. While outside the scope of this disclosure, a more thorough description and several variations of optical surface scattering devices utilizing two-dimensional arrays of pillars of various shapes and sizes can be found in the patent applications and patent publications identified and incorporated by reference herein.

The presently described multicoated metal pillar approach described herein can be applied and utilized in conjunction with any of the various arrangements and configurations of two-dimensional arrays of subwavelength resonant elements described in the various disclosures incorporated by reference herein. As illustrated, each multicoated rectangular metal pillar 291 and 292 extends from an optically reflective surface 290 but is electrically isolated therefrom by the dielectric layer 295 (e.g., a dielectric via layer) and the dielectric etch-stop layer 296.

The front row of multicoated rectangular metal pillar pairs 205 is shown as a cut-away cross-section to illustrate the internal layers and elements of each multicoated rectangular metal pillar. As illustrated, each multicoated rectangular metal pillar 291 includes a conductive metal core 250, such as a copper metal core, that is formed on a conductive barrier material 240, such as a tantalum-based barrier layer, on the dielectric etch-stop layer 296. In the illustrated example, an optically reflective metal coating 275 (such as silver) is illustrated that is deposited on five sides of the conductive metal core 250.

As illustrated, a passivation layer 260 is deposited to cover the optically reflective metal coating 275 and/or any otherwise exposed surfaces of the conductive metal core 250. In some embodiments, the passivation layer 260 may also be applied to the surface of the dielectric etch-stop layer 296 and/or to the surface between each multicoated rectangular metal pillar pair 205, where the adjustable refractive index material 293 is deposited.

In some embodiments, the adjustable refractive index material 293, such as liquid crystal, may be applied uniformly as a layer on top of the dielectric etch-stop layer 296 to fill in all the spaces and gaps between all the multicoated rectangular metal pillars, including between paired multicoated rectangular metal pillars and between neighboring multicoated rectangular metal pillar pairs 205. In some embodiments, the two-dimensional array of multicoated rectangular metal pillars may be uniformly distributed on the dielectric etch-stop layer 296 with a layer of adjustable refractive index material 293 deposited to fill the gaps therebetween. In such an embodiment, each multicoated rectangular metal pillar may be voltage-controlled to modify the refractive index of the adjustable refractive index material 293 between itself and multiple neighboring multicoated rectangular metal pillars.

Figure 2B:
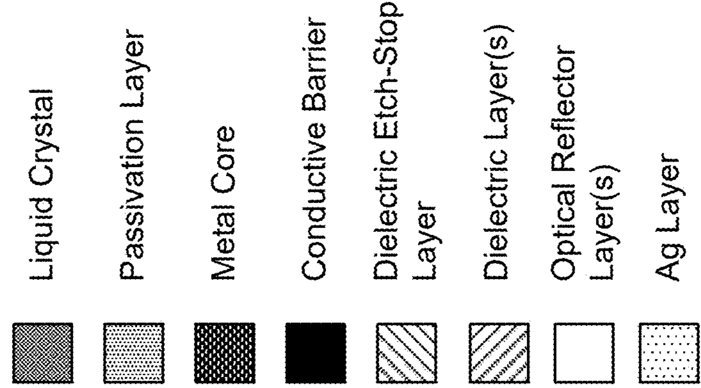
FIG. 2B illustrates an example diagram of two metal pillars of a tunable metasurface with multilayer passivation coatings, according to one embodiment.
Figure 2B:
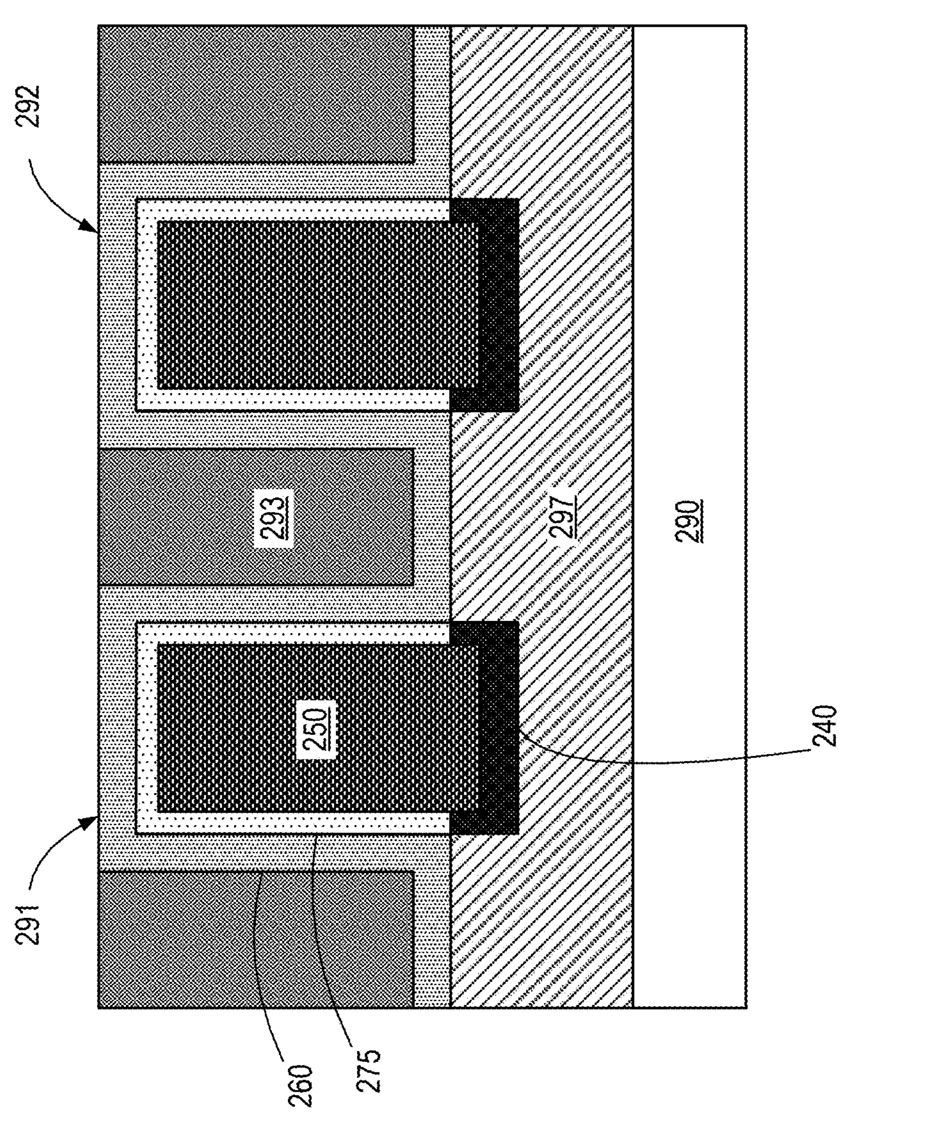

FIG. 2B illustrates an example diagram of two metal pillars 291 and 292 of a two-dimensionally steerable tunable metasurface, according to one embodiment. As illustrated, a single dielectric layer 297 separates the multicoated elongated metal rails 291 and 292 from the optical reflector layer 290. In the illustrated example, the dielectric etch-stop layer 296 of FIG. 2A is omitted. In such an embodiment, the depth to which the trenches are etched (as described in greater detail below) may be controlled by the duration of the etching process, the etching solution utilized, and/or the etching process utilized.

Liquid crystal 293 is positioned between the two metal pillars 291 and 292. In the illustrated embodiment, the two metal pillars 291 and 292 extend from an optical reflector layer 290 but are electrically isolated therefrom by the dielectric layer 297. A conductive barrier material 240 facilitates through-substrate control line connections (e.g., for applying voltage differentials to the two metal pillars 291 and 292). Each of the two metal pillars 291 and 292 includes a conductive metal core 250.

In the illustrated embodiment, an optically reflective metal coating 275 is applied to (e.g., deposited on) the sidewalls and top wall of the metal core 250 of each respective metal pillar 291 and 292. The optically reflective metal coating 275 is referred to as a “first” coating on the conductive metal core 250 of each respective metal pillar 291 and 292. A passivation layer or passivation coating 260 constitutes the “second” coating on the conductive metal core 250 of each respective metal pillar 291 and 292. As described herein, the passivation layer or passivation coating 260 may be a multilayer passivation coating that includes multiple layers to provide various functionalities.

FIGS. 3A-3I illustrate example diagrams of a manufacturing process for a metasurface with metallic extension elements (e.g., rails, pillars, or the like) with multilayer passivation coatings, according to various embodiments. In many embodiments, an optical reflector layer may be utilized for reflective-type metasurfaces. The optical reflector layer is omitted from the illustrated diagrams, as are other possible underlying layers outside of the scope of this disclosure. A similar configuration without an optical reflector layer may be used for transmissive or transmit-type metasurfaces.

Figure 3C:
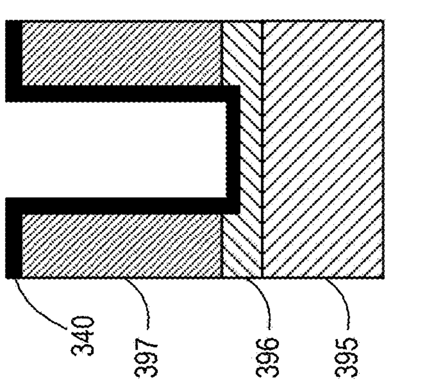
FIGS. 3A-3I illustrate example diagrams of a manufacturing process for a metasurface with metallic extension elements (e.g., rails, pillars, or the like) with multilayer passivation coatings, according to various embodiments.
Figure 3F:
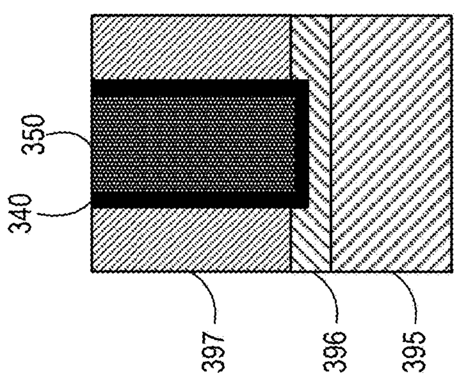
Figure 3B:
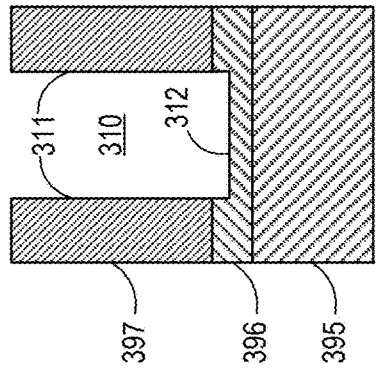
Figure 3E:
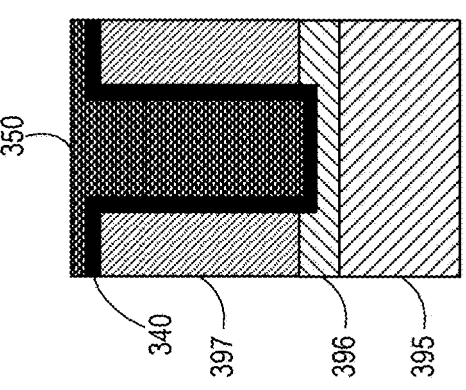
Figure 3A:
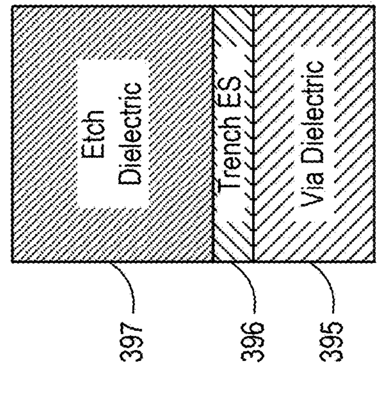

FIG. 3A illustrates a dielectric via layer 395, a dielectric etch-stop layer 396, and a dielectric etch layer 397 (e.g., TEOS material), which can be collectively referred to as a dielectric substrate. In some embodiments, the dielectric via layer 395, the dielectric etch-stop layer 396, and the dielectric etch layer 397 are the same material and/or even the same deposition layer. In such embodiments, the dielectric etch-stop layer 396 is merely conceptual and/or useful in discussing the depth to which etching takes place to form the pillars, rails, or other extension elements. In other embodiments, the dielectric etch-stop layer 396 is a different material than the dielectric etch layer 397. An etching process may be utilized that is capable of etching the dielectric etch layer 397 but unable to etch (or only slowly etch) the dielectric etch-stop layer 396. In such embodiments, the dielectric etch-stop layer 396 functions to limit or control the depth to which the extension element is etched within the dielectric etch layer 397. For example, the dielectric via layer 395 and the dielectric etch layer 397 may comprise silicon (Si). The dielectric etch-stop layer 396 may comprise a silicon oxide layer that is resistive to some etching processes and/or etching solutions. Any of the wide variety of etch-stop layer deposition and etching approaches known in the industry may be utilized, including maskless lithography using silicon oxide etch-stop layers induced by laser pulses.

FIG. 3B illustrates a cross-section of trench or cavity 310 etched in the dielectric etch layer 397 that stops at or slightly within the dielectric etch-stop layer 396. A method to manufacture a tunable optical device may include etching the dielectric etch layer 397 to form an array of cavities (or trenches). Each trench or cavity 310 may have substantially vertical sidewalls 311 (as illustrated) separated by a base wall 312 that has a width less than a wavelength within the operational bandwidth of the tunable optical device (e.g., metasurface). In subsequent figures, the sidewalls 311 and base wall 312 of the trench or cavity 310 are not labeled to avoid obscuring other aspects of the figures.

Etching the trench or cavity 310 may be implemented using any of a wide variety of lithography and etching technologies and approaches. Examples of suitable approaches for etching the trench or cavity 310 include but are not limited to nanolithography, photoresist patterning, reactive ion etching (RIE), wet chemical etching, ion beam etching (IBE), reactive ion beam etching (RIBE), ion beam milling (IBM), and the like.

FIG. 3C illustrates a conductive barrier material 340 deposited on the base wall 312 of the trench or cavity 310. In the illustrated embodiment, the conductive barrier material 340 is deposited as a conformal layer on the base wall 312 and sidewalls 311 of the trench or cavity 310 as well as outside of the trench pr cavity on the upper surfaces of the dielectric etch layer 397. Any of a wide variety of thin-film or layer deposition processes may be utilized to deposit the conductive barrier material 340, including but not limited to atomic layer deposition (ALD), chemical vapor deposition (CVD), electroless deposition (ELD), sputtering, evaporation deposition, and the like. In some embodiments, selective deposition techniques may be utilized to limit the deposition of the conductive barrier material 340 to cover only the base wall 312 of the trench or cavity 310. According to various embodiments, the conductive barrier material 340 may be tantalum and/or a tantalum nitride.

Figure 3D:
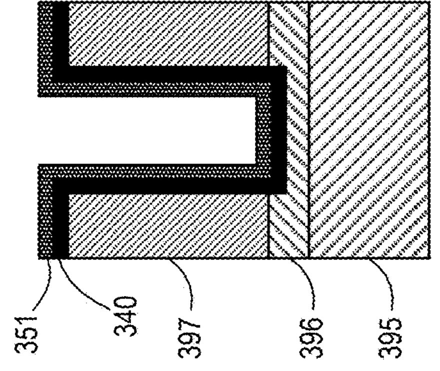

FIG. 3D illustrates a conductive metal seed 351 deposition within the trench or cavity 310. In various embodiments, the conductive metal seed 351 is copper or a copper alloy. In alternative embodiments, the conductive metal seed 351 may comprise one or more of, or a combination of, copper, aluminum, and tungsten. In some embodiments, the conductive metal seed 351 may be deposited using a chemical vapor deposition process, a sputtering process, or another thin-film deposition process. In some embodiments, selective deposition techniques may be utilized to limit the deposition of the conductive metal seed 351 to only cover the sidewalls 311 and/or base wall 312 of the trench or cavity 310.

FIG. 3E illustrates the trench or cavity 310 filled with a conductive metal 350 (e.g., copper). According to various embodiments, the trench or cavity 310 may be filled with the conductive metal 350 via electrochemical plating (ECP) using the conductive metal seed 351 as the "seed" for the electrochemical plating process.

FIG. 3F illustrates the conductive metal 350 and the conductive barrier material 340 within the trench or cavity 310. The upper surfaces outside of the trench or cavity 310 have been removed by, for example, chemical mechanical planarization (CMP). In alternative embodiments, any of a wide variety of chemical or mechanical removal processes may be utilized.

Figure 3I:
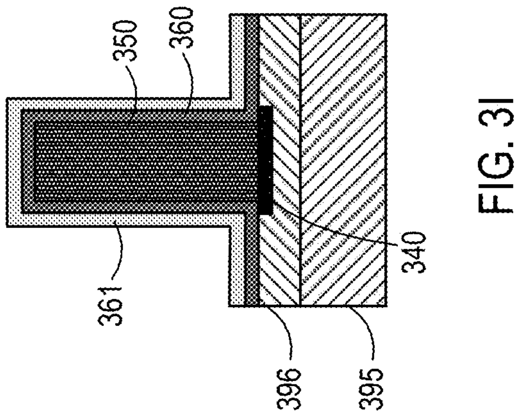
Figure 3H:
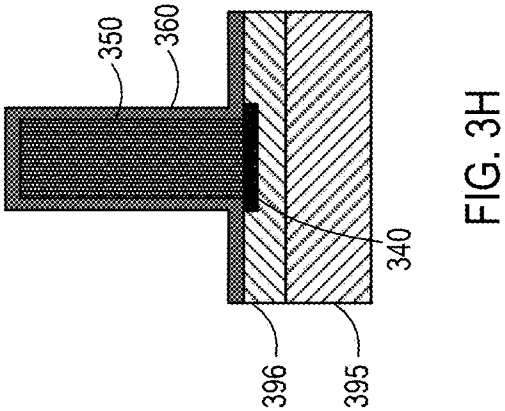
Figure 3G:
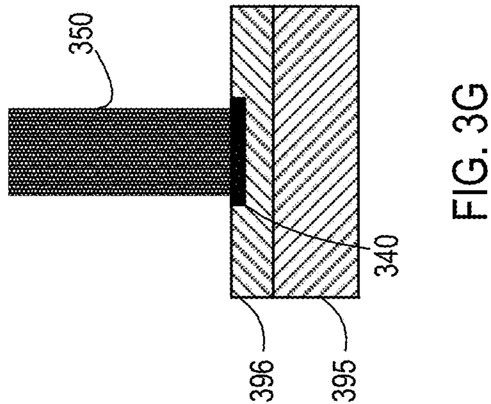

FIG. 3G illustrates the material on either side of the conductive metal 350 removed, including the dielectric etch layer 397 and the conductive barrier material 340 on the sidewalls 311 of the trench or cavity 310. As illustrated, with the material between adjacent elongated trenches or cavities 310 removed, the conductive metal 350 is exposed. The illustration shows only a single "core" of the conductive metal 350 extending from the dielectric etch-stop layer 396. The conductive metal 350 core includes opposing sidewalls, a top wall, and a base wall. The base wall of the conductive metal 350 is separated from the dielectric etch-stop layer 396 by the remaining region (patch or layer) of the conductive barrier material 340. The conductive metal 350 (e.g., copper or a copper alloy) may be treated or prepared for passivation via residue or oxidization removal (e.g., to remove copper oxide). In some embodiments, an adhesion layer may be applied to the conductive metal 350 prior to the first passivation coating.

FIG. 3H illustrates the conductive metal 350 with a first passivation coating 360 applied to the sidewalls and top wall thereof. The first passivation coating 360 may be deposited using a chemical vapor deposition process, a sputtering process, or another thin-film deposition process. The first passivation coating 360 may also coat the surface of the dielectric etch-stop layer 396 at the bottom of the gaps between adjacent conductive metal 350 cores in the one-dimensional or two-dimensional array.

According to some example embodiments, the first passivation coating 360 is applied using atomic layer deposition (ALD), which may facilitate a more even coating on the sidewalls and within any defects in the conductive metal 350. A material that adheres well to the conductive metal 350 may be selected for the first passivation coating 360. The material selected for the first passivation coating 360 may also prevent metal diffusion in the other passivation coatings and/or into the liquid crystal (or another tunable dielectric). Examples of possible materials for the first passivation coating 360 include but are not limited to silicon nitride (SiN) and silicon dioxide ($SiO_2$).

FIG. 3I illustrates a second passivation coating 361 coating applied to the conductive metal 350. The second passivation coating 361 may be the final passivation coating in the multilayer passivation coating of the conductive metal 350. Again, the second passivation coating 361 may be applied using atomic layer deposition or another thin film deposition process. The material selected for the second passivation coating 361 may have a relatively high dielectric constant (k), prevent metal (e.g., copper) from diffusing from the conductive metal 350 into the liquid crystal (or other tunable dielectric materials), provide a time-dependent dielectric barrier (e.g., high breakdown voltage), be resistant to physical damage from rotating liquid crystals, exhibit strong surface energy that causes the liquid crystals to rotate to vertical against the sidewalls in the absence of an applied voltage, be relatively thin, and/or adhere well to the first passivation coating 360.

Examples of possible materials that exhibit many of the properties identified above for the second passivation coating 361 include but are not limited to $Al_2O_3$, $TiO_2$, $HfO_2$, AlN, and $ZrO_2$. In some embodiments, one or both of the first passivation coating 360 and the second passivation coating 361 may be applied using atomic layer deposition and/or a precursor gas. In some embodiments, the passivation coatings may be applied using different deposition techniques. For example, the first passivation coating 360 may be a silicon nitride (SiN) coating that is applied using plasma-enhanced chemical vapor deposition (PECVD) technique, followed by an atomic layer deposition of hafnium dioxide ($HfO_2$).

Figure 4:
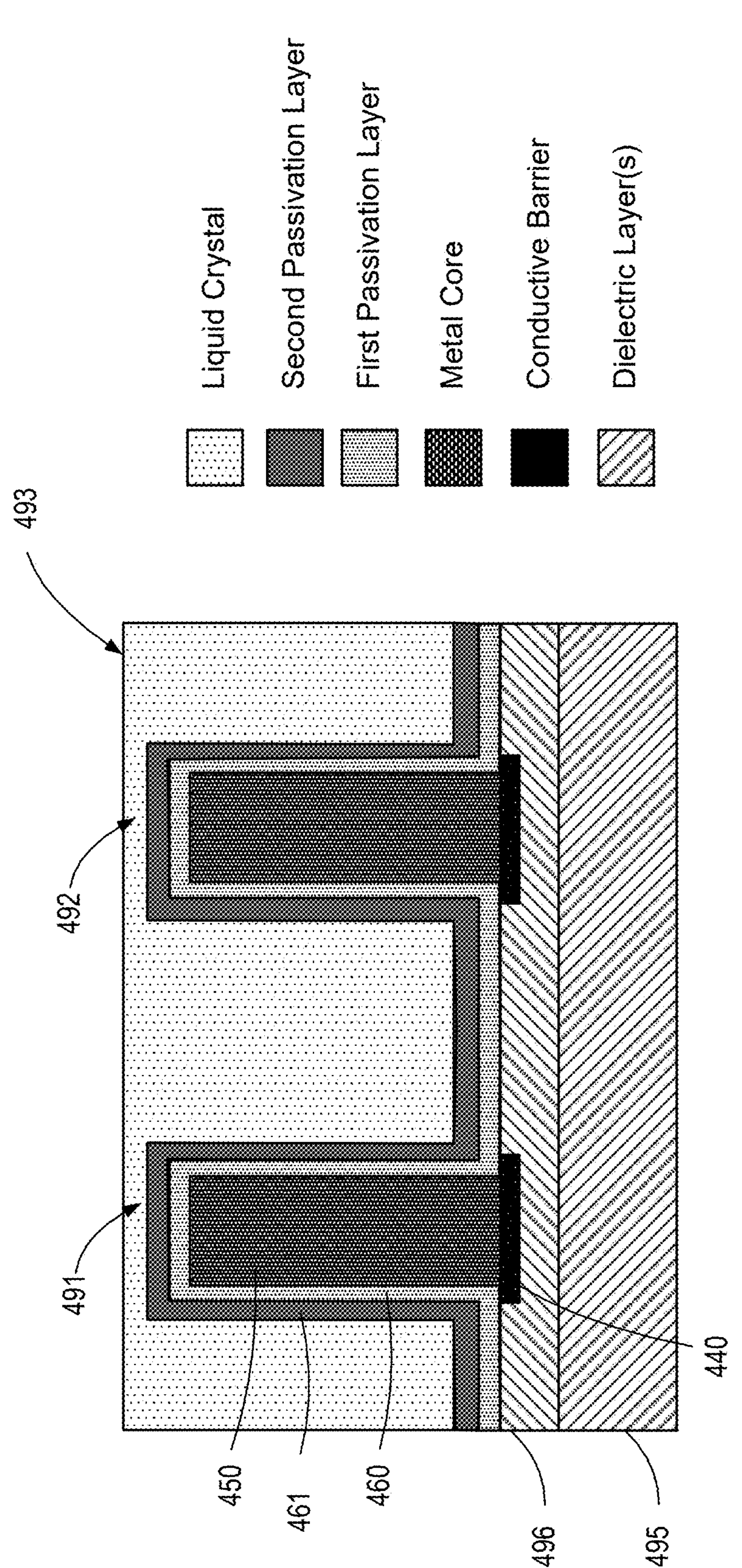
FIG. 4 illustrates a diagram of a two-dimensional cross-section of two multilayer passivated metallic extension elements filled with a tunable dielectric to form a tunable optical resonator, according to one embodiment.

FIG. 4 illustrates a diagram of a two-dimensional cross-section of two multilayer passivated metallic extension elements 491 and 492 filled with a tunable dielectric 493 to form a tunable optical resonator, according to one embodiment. The multilayer passivated metallic extension elements 491 and 492 extend from a dielectric etch-stop layer 396 and a dielectric via layer 496. Liquid crystal or another refractive index tunable dielectric material 493 is positioned between the metallic extension elements 491 and 492, thereby forming a tunable optical resonator.

Each metallic extension element 491 and 492 has a conductive metal core 450 (e.g., copper). A conductive barrier material 440 separates a base wall of the conductive metal core 450 of each metallic extension element 491 and 492 from the underlying dielectric etch-stop layer 496. A controller or metasurface driver (not illustrated) may apply voltage differential bias patterns to the metallic extension elements 491 and 492 to modify a reflection phase and/or amplitude of the tunable optical resonator. In some embodiments, conductive vias or control lines from the controller or metasurface driver may pass through gaps in an underlying optical reflector layer and the dielectric layers 495/496 to make electrical connections with each respective metallic extension element 491 and 492 via the conductive barrier material 440.

The multilayer passivation coating on each metallic extension element 491 and 492 includes a first passivation coating 460 and a second passivation coating 461. The first and second passivation coatings 460 and 461 are selected such that the first passivation coating 460 adheres to the conductive metal core 450 and the second passivation coating 461 exhibits a strong interaction with the liquid crystal 493 (or other tunable dielectric materials) to improve the switching speed of the liquid crystals and be resistant to chemical and physical interactions with the liquid crystals. At least one of the first passivation coating 460 and second passivation coating 461 will also operate to reduce copper (or other metal) diffusion into the liquid crystal 493 and reduce oxidization of the copper (or other metal). The combination of the first passivation coating 460 and the second passivation coating 461 provides a high dielectric constant (k), such that the voltage drop between the metallic extension elements 491 and 492 occurs within the liquid crystal and not within the multilayer passivation coating.

Examples of possible materials to prevent or reduce copper diffusion include silicon nitride (SiN), silicon dioxide ($SiO_2$), titanium-silicon-nitride (TiSN), and the like. Additional examples of possible materials to prevent or reduce copper diffusion and/or interact to improve the switching speed of liquid crystal include but are not limited to $Al_2O_3$, $TiO_2$, $HfO_2$, AlN, and $ZrO_2$. As described below, the multilayer passivation coating may include any number of passivation coatings to facilitate one or more of the above-identified functionalities or target properties.

Figure 5:
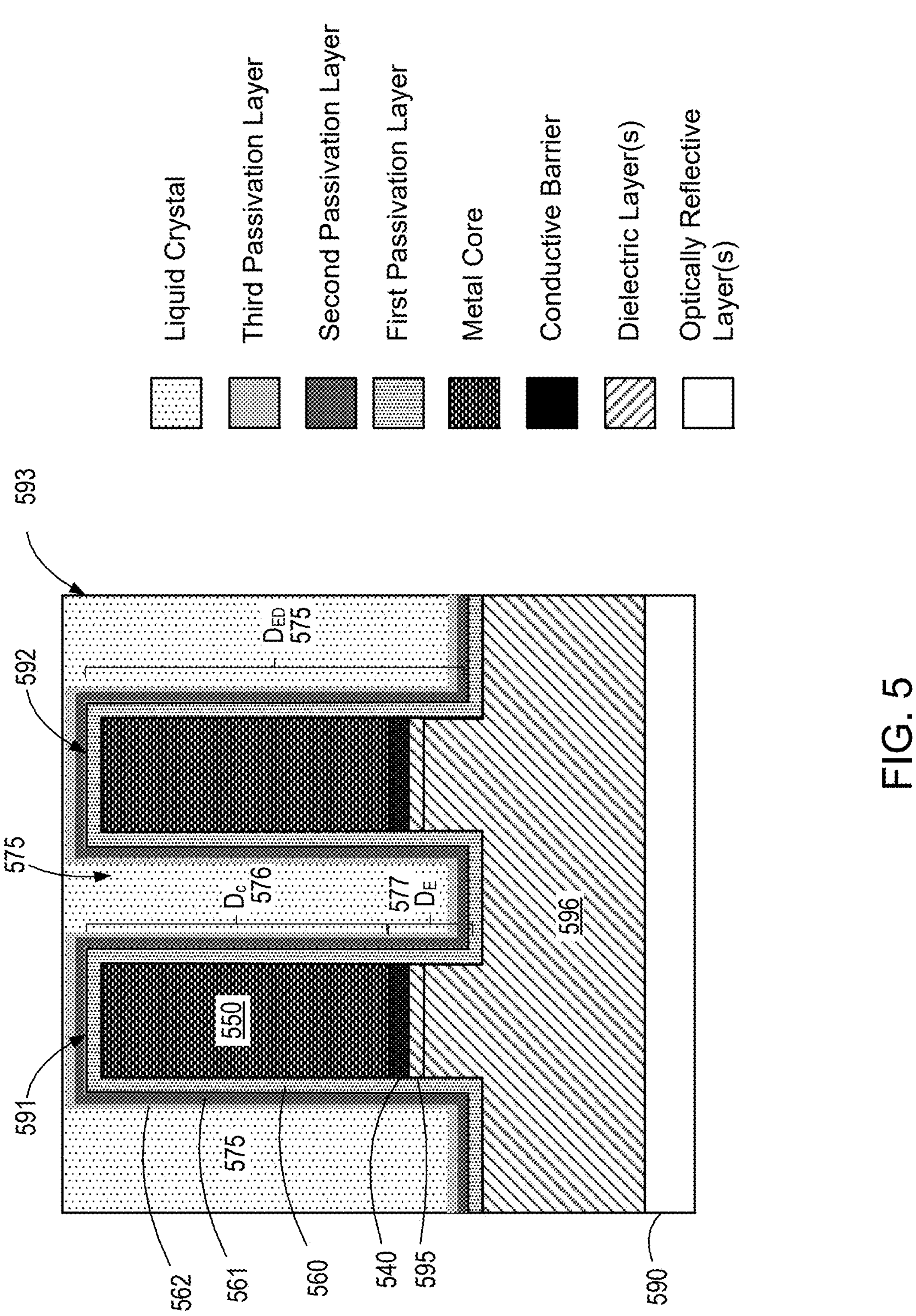
FIG. 5 illustrates a diagram of a two-dimensional cross-section of an extended-depth channel between two multilayer passivated metallic extension elements filled with a tunable dielectric to form a tunable optical resonator, according to one embodiment.

FIG. 5 illustrates a diagram of a two-dimensional cross-section of an extended-depth channel or cavity between two multilayer passivated metallic extension elements filled with a tunable dielectric to form a tunable optical resonator, according to one embodiment. As illustrated, the base of each etched channel or cavity 575 is etched through the dielectric etch-stop layer 595 and into the dielectric layer 596. An optical reflector layer 590 is positioned beneath the dielectric layer 596. Metallic extension elements 591 and 592 are arranged at sub-wavelength intervals and extend vertically from the dielectric layers 595/596.

The metallic extension elements 591 and 592 may be made of metal or have a conductive metal core 550, such as a copper metal core. The multilayer passivation coating includes a first passivation coating 560, a second passivation coating 561, and a third passivation coating 562. At least one of the first, second, and third passivation coatings 560, 561, and 562 functions as a diffusion barrier to prevent the metal (e.g., copper) from diffusing from the conductive metal core 550 into the liquid crystal 593. At least one of the first, second, and third passivation coatings 560, 561, and 562 functions to reduce oxidization of the conductive metal core 550.

The first passivation coating 560 adheres well to the conductive metal core 550. The third passivation coating 562 is resistant to physical damage from and chemical interactions with the liquid crystal 593. In some embodiments, the third passivation coating 562 has a strong interaction with the liquid crystals to improve the switching speed. For example, the third passivation coating 562 may exhibit a surface tension or other surface force that causes the liquid crystals to vertically align to the sidewalls of the metallic extension elements 591 and 592 when the voltage differential is zero. The third passivation coating 562 may be selected to include a material that induces this vertical alignment more quickly than if the liquid crystal were in contact with the first or second passivation coating.

A conductive barrier material 540 may separate a base wall of the conductive metal core 550 of each of the metallic extension elements 591 and 592 from the dielectric etch stop layer 595. As illustrated, each extended-depth channel or cavity 575 extends to a depth beyond the base wall of the adjacent metallic extension elements 591 and 592. Liquid crystal 593 or another refractive index tunable dielectric material is positioned between the metallic extension elements 591 and 592. A controller or metasurface driver (not illustrated) may apply voltage differential bias patterns to the metallic extension elements 591 and 592 to modify a reflection phase and/or amplitude of the resonators.

As illustrated, each extended-depth channel or cavity 575 includes an initial portion 576 (e.g., a standard channel or cavity) and an extension portion 577. The depth, Dc, of the standard portion 576 is illustrated as extending from the top wall of the metallic extension element 591 down to approximately the upper surface of the conductive barrier 540. The depth, $D_E$, of the extension portion 577 is represented as the distance between the upper surface of the conductive barrier 540 and the bottom of the channel or cavity 575 within the dielectric layer 596. Accordingly, the extended-depth channel or cavity 575 has a depth, $D_{ED}$, that extends from the upper wall of the metallic extension element 592 through the etch-stop dielectric layer 595 to the bottom of the channel or cavity 575 within the dielectric layer 596 (or at least until the uppermost layer of the multilayer passivation coating).

Figure 6:
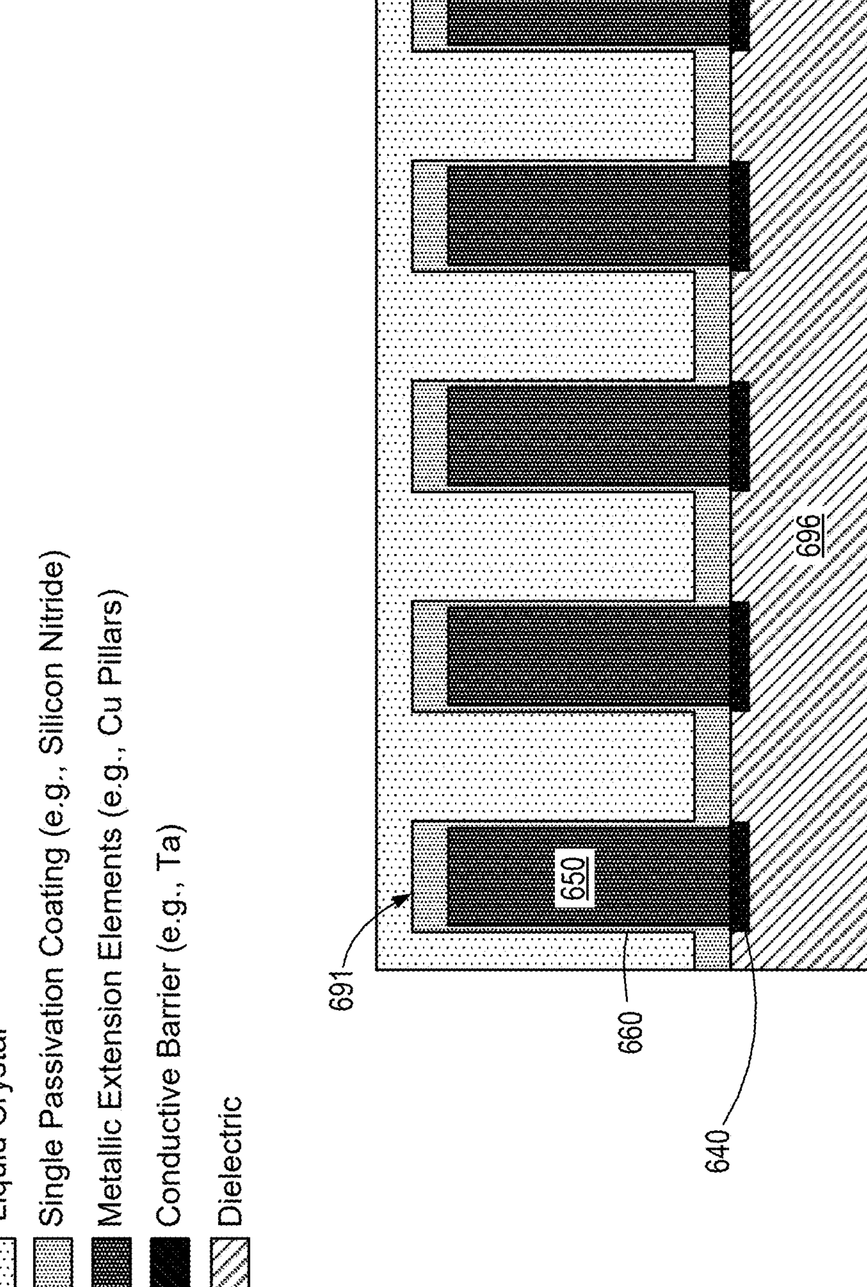
FIG. 6 illustrates a tunable dielectric material positioned between single-layer passivated metallic extension elements to form a tunable optical metasurface, according to one embodiment.

FIG. 6 illustrates a tunable dielectric material 693 positioned between single-layer passivated metallic extension elements 691 to form a tunable optical metasurface, according to one embodiment. According to the illustrated embodiment, a plurality of metallic extension elements 691 extend vertically from a dielectric layer 696 relative to an underlying reflector layer 690. A conductive barrier material 640 may separate a base wall of the conductive metal core 650 of each metallic extension element 691 from the dielectric layer 696. The conductive barrier material 640 may, for example, prevent copper diffusion from the conductive metal core 650 into the dielectric layer 696 while still providing a conductive electrical connection to the metallic extension elements 691. Conductive vias may be formed in the dielectric layer 696 to connect the metallic extension elements 691 to various driver elements.

The conductive metal core 650 includes a single-layer passivation coating 660. The single-layer passivation coating 660 may be selected to, at a minimum, (i) adhere to the conductive metal core 650, (ii) passivate the conductive metal core 650 to prevent or reduce corrosion thereof, and (iii) act as a diffusion barrier to prevent or reduce diffusion of the metal (e.g., copper) into the liquid crystal. Silicon nitride may be an adequate material for use as a single-layer passivation coating 660. However, it may be desirable that the passivation coating also perform one or more of the following additional functions: be resistant to physical damage from and chemical interactions with the liquid crystal 693; interact strongly with the liquid crystal to improved switching speeds, have a high dielectric constant, have a high time-dependent dielectric barrier. Silicon nitride has a relatively high dielectric constant, but higher dielectric constants are possible with other materials. Silicon nitride is adequate but not optimally resistant to physical damage from rotating liquid crystals. Silicon nitride does not strongly interact with liquid crystals to cause the liquid crystals to align in any specific orientation in the presence or absence of a voltage differential.

Figure 7:
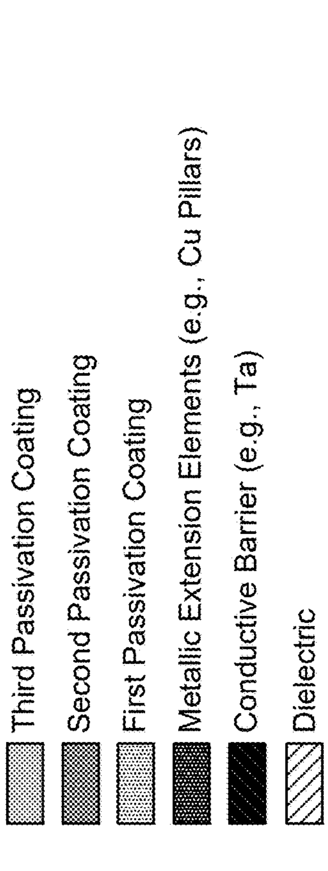
FIG. 7 illustrates a tunable dielectric material positioned between multilayer passivated metallic extension elements to form a tunable optical metasurface, according to one embodiment.
Figure 7:
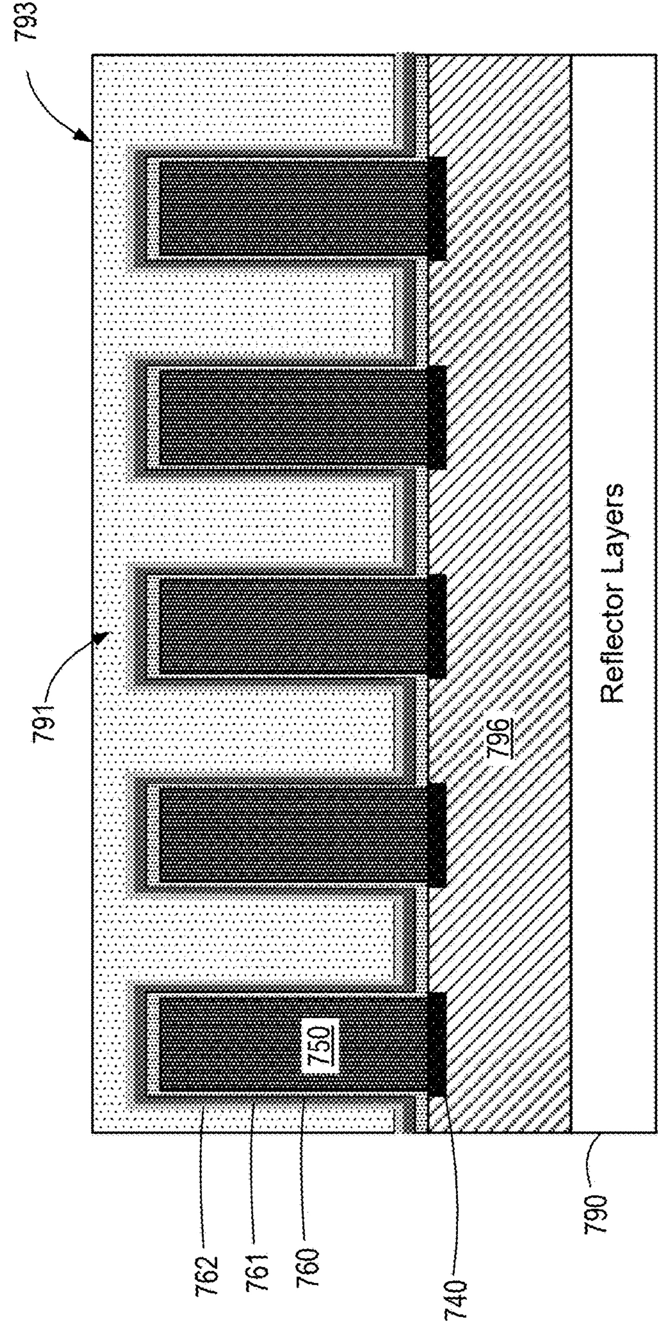

FIG. 7 illustrates a tunable dielectric material 793 positioned between multilayer passivated metallic extension elements 791 to form a tunable optical metasurface, according to one embodiment. As illustrated, the plurality of metallic extension elements 791 extend vertically from a dielectric layer 796 relative to the underlying reflector layer 790. A conductive barrier material 740 (e.g., tantalum (Ta), tantalum nitride (TaN), or titanium nitride (TiN)) separates a base wall of the conductive metal core 750 of each metallic extension element 791 from the dielectric layer 796. Again, the conductive barrier material 740 may, for example, prevent copper diffusion from the conductive metal core 750 into the dielectric layer 796 while still providing a conductive electrical connection to the metallic extension elements 791. The conductive metal core 750 includes a multilayer passivation coating that includes a first passivation coating 760, a second passivation coating 761, and a third passivation coating 762.

The first passivation coating 760 is selected to be a material suitable to (i) adhere to the conductive metal core 750 and (ii) prevent corrosion of the conductive metal core 750. The first passivation coating 760 may be, for example, silicon nitride, silicon dioxide, or another suitable passivation film for the metal or alloy used in the conductive metal core 750.

The third passivation coating 762 is selected to be a material suitable to (i) be resistant to physical damage from the liquid crystal 793, (ii) be resistant to chemical interactions with the liquid crystal 793, and (iii) interact strongly with the liquid crystal 793 to improved switching speeds (interfacial characteristics with the liquid crystal). For example, the third passivation coating 762 may have surface characteristics that facilitate alignment of the tunable dielectric to increase the switching speed of the tunable dielectric (e.g., the liquid crystals may tend to align naturally or automatically against the vertical walls within the channels or cavities).

The second passivation coating 761 is selected to be a material suitable to (i) adhere to the first passivation coating 760 and (ii) adhere to the third passivation coating 762. For example, in one embodiment, the second passivation coating 761 (*i*) functions as a diffusion barrier to prevent or reduce metal (e.g., copper) from diffusing into the liquid crystal 793 from the conductive metal core 750 and (ii) facilitates adhesion between the first and third passivation coatings 760 and 762.

According to various embodiments, at least one of the first, second, and third passivation coatings 760, 761, and 762 functions as a diffusion barrier to prevent or reduce metal (e.g., copper) from diffusing into the liquid crystal 793 from the conductive metal core 750. According to various embodiments, one or more of the first, second, and third passivation coatings 760, 761, and 762 are deposited using atomic layer deposition techniques. In one specific example, each of the first, second, and third passivation coatings 760, 761, and 762 are selected from a group of materials consisting of $Al_2O_3$, $TiO_2$, $HfO_2$, AlN, $ZrO_2$, $SiO_2$, and SiN.

In some embodiments, a layer of silver, gold, platinum, or other highly reflective conductive material is layered directly on the sidewalls or top wall of the conductive metal core 750. In such embodiments, the multilayer passivation coating is applied to the highly reflective conductive material layered on the portion or portions of the conductive metal core 750. For example, a multilayer passivation coating may be applied, according to any of the various embodiments described herein, to a conductive metal core 750 that is formed to have a silver-plated copper core.

The relatively high dielectric constant of the multilayer passivation coating increases the percentage of the voltage drop that occurs within the liquid crystal 793 between adjacent metallic extension elements 791. Various embodiments are described herein, in which the multilayer passivation coating includes two or three distinct layers. However, it is appreciated that any number of layers may be utilized to accomplish the functionalities described herein. For example, one embodiment of a multilayer passivation coating may include an adhesion layer applied to a copper core, followed by a first functional passivation layer. A second adhesion layer may then be applied, followed by the second functional passivation layer. Finally, a third adhesion layer may be applied, after which a third functional passivation layer is deposited. Any number of functional passivation layers may be deposited, and some of them may utilize an intermediary adhesion layer while others may not need an intermediary adhesion layer.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. This disclosure should, therefore, be understood to encompass at least the following claims and all possible permutations thereof.

What is claimed is:

1. A tunable optical device, comprising:

a dielectric substrate;

an array of metallic extension elements extending from the dielectric substrate and spaced from one another by less than a wavelength of an operational bandwidth to form subwavelength gaps between adjacent metallic extension elements, wherein each metallic extension element comprises a metal core having a base wall, opposing sidewalls, and a top wall;

a conductive barrier material positioned between the base wall of each metal core and the dielectric substrate;

a tunable dielectric material that has a tunable refractive index positioned within the gaps between adjacent metallic extension elements; and a multilayer passivation coating applied to at least the opposing sidewalls and the top wall of the metal core of each respective metallic extension element, the multilayer passivation coating comprising:

a first passivation coating that exhibits strong adhesion properties to the metal core and prevents corrosion of the metal core; and a second passivation coating with surface characteristics that facilitate alignment of the tunable dielectric material to increase a switching speed thereof.

2. The device of claim 1, wherein at least one of the first passivation coating and the second passivation coating is a diffusion barrier that prevents diffusion of metal from the metal core into the tunable dielectric material.

3. The device of claim 1, wherein the first passivation coating comprises one of: $Al_2O_3$, $TiO_2$, $HfO_2$, AlN, $ZrO_2$, $SiO_2$, and SiN, and wherein the second passivation coating comprises a different one of: $Al_2O_3$, $TiO_2$, $HfO_2$, AlN, $ZrO_2$, $SiO_2$, and SiN.

4. The device of claim 1, wherein the first passivation coating comprises SiN and the second passivation coating comprises $HfO_2$.

5. The device of claim 1, wherein the tunable dielectric material comprises one or more of: liquid crystal, an electro-optic polymer, a chalcogenide glass, and a semiconductor material, wherein the conductive barrier material comprises one of tantalum (Ta), tantalum nitride (TaN), and titanium nitride (TiN), and wherein the metallic extension elements comprise one of copper pillars and copper rails.

6. The device of claim 1, further comprising a third passivation coating that is positioned between the first and second passivation coatings.

7. The device of claim 6, wherein the third passivation coating facilitates adhesion of the second passivation coating to the first passivation coating.

8. The device of claim 6, wherein the third passivation coating is a diffusion barrier that prevents diffusion of metal from the metal core into the tunable dielectric material.

9. The device of claim 6, wherein the third passivation coating comprises one of $Al_2O_3$, $TiO_2$, $HfO_2$, AlN, $ZrO_2$, $SiO_2$, and SiN.

10. A tunable optical device, comprising:

a dielectric substrate;

an array of copper pillars extending from the dielectric substrate and spaced from one another by less than a wavelength of an operational bandwidth to form subwavelength gaps between adjacent copper pillars, wherein each copper pillar has a base wall, opposing sidewalls, and a top wall;

a conductive barrier material positioned between the base wall of each copper pillar and the dielectric substrate, wherein the conductive barrier material comprises one of tantalum, tantalum nitride, and titanium nitride;

liquid crystal positioned within the gaps between adjacent copper pillars; and a multilayer passivation coating applied to at least the opposing sidewalls and the top wall of each copper pillar, the multilayer passivation coating comprising:

a first passivation coating of SiN adhered to the copper pillars; and a second passivation coating adhered to the first passivation coating of SiN, wherein the second passivation coating is in contact with the liquid crystal and prevents the liquid crystal from contacting the first passivation coating of SiN.

11. The device of claim 10, wherein the second passivation coating comprises one of $Al_2O_3$, $TiO_2$, $HfO_2$, AlN, $ZrO_2$, $SiO_2$, and SiN.

12. The device of claim 10, further comprising a third passivation coating that is positioned between the first passivation coating of SiN and the second passivation coating.

13. The device of claim 12, wherein the third passivation coating comprises one of $Al_2O_3$, $TiO_2$, $HfO_2$, AlN, $ZrO_2$, $SiO_2$, and SiN.

14. The device of claim 10, wherein the copper pillars are at least one of rectangular, circular, oval, hexagonal, and polygonal.

15. A tunable optical device, comprising:

a dielectric substrate;

an array of metallic extension elements extending from the dielectric substrate and spaced from one another by less than a wavelength of an operational bandwidth to form subwavelength gaps between adjacent metallic extension elements, wherein each metallic extension element comprises a metal core having a base wall, opposing sidewalls, and a top wall;

a tunable dielectric material that has a tunable refractive index positioned within the gaps between adjacent metallic extension elements; and a multilayer passivation coating applied to at least the opposing sidewalls and the top wall of the metal core of each respective metallic extension element, the multilayer passivation coating comprising:

a first passivation coating that:

(i) exhibits strong adhesion properties to the metal core, and (ii) prevents corrosion of the metal core; and a second passivation coating with surface characteristics that are at least:

(i) resistant to damage by manufacturing processes associated with deposition of the tunable dielectric material, and (ii) resistant to damage by the tunable dielectric material.

16. The device of claim 15, further comprising:

a conductive barrier material positioned between the base wall of each metal core and the dielectric substrate.

17. The device of claim 16, wherein the conductive barrier material comprises one of tantalum (Ta), tantalum nitride (TaN), and titanium nitride (TiN).

18. The device of claim 15, wherein the first passivation coating comprises one of: $Al_2O_3$, $TiO_2$, $HfO_2$, AlN, $ZrO_2$, $SiO_2$, and SiN, and wherein the second passivation coating comprises a different one of: $Al_2O_3$, $TiO_2$, $HfO_2$, AlN, $ZrO_2$, $SiO_2$, and SiN.

19. The device of claim 15, wherein the tunable dielectric material comprises one or more of: liquid crystal, an electro-optic polymer, a chalcogenide glass, and a semiconductor material.

20. The device of claim 15, wherein the manufacturing processes associated with the deposition of the tunable dielectric material comprise an oxygen plasma cleaning, and wherein the second passivation coating is selected to protect the first passivation coating from being damaged by the oxygen plasma cleaning.

21. The device of claim 15, wherein the manufacturing processes associated with the deposition of the tunable dielectric material comprise a precleaning process, and wherein the second passivation coating is selected to protect the first passivation coating from being damaged by the precleaning process.

22. The device of claim 15, wherein the manufacturing processes associated with the deposition of the tunable dielectric material comprise depositing the tunable dielectric material via a pulse laser deposition process, and wherein the second passivation coating is selected to protect the first passivation coating from being damaged by the pulse laser deposition process.

23. The device of claim 15, wherein the manufacturing processes associated with the deposition of the tunable dielectric material comprise depositing the tunable dielectric material via a physical vapor deposition (PVD) process, and wherein the second passivation coating is selected to protect the first passivation coating from being damaged by the PVD process.

24. The device of claim 15, further comprising a third passivation coating that is positioned between the first and second passivation coatings.

25. The device of claim 24, wherein the third passivation coating facilitates adhesion of the second passivation coating to the first passivation coating.

26. The device of claim 24, wherein the third passivation coating is a diffusion barrier that prevents diffusion of metal from the metal core into the tunable dielectric.

27. The device of claim 24, wherein the third passivation coating comprises one of $Al_2O_3$, $TiO_2$, $HfO_2$, AlN, $ZrO_2$, $SiO_2$, and SiN.

* * * * *